3 Sheets—Sheet 3.

D. CILLEY.
Saw-Mill.

No. 218,709. Patented Aug. 19, 1879.

Attest:
H. L. Perrine
Floyd Norris

Inventor.
Daniel Cilley
By Johnson & Johnson
Atty's

UNITED STATES PATENT OFFICE

DANIEL CILLEY, OF GRAND RAPIDS, MICHIGAN.

IMPROVEMENT IN SAW-MILLS.

Specification forming part of Letters Patent No. 218,709, dated August 19, 1879; application filed April 14, 1879.

*To all whom it may concern:*

Be it known that I, DANIEL CILLEY, of Grand Rapids, in the county of Kent and State of Michigan, have invented certain new and useful Improvements in Saw-Mills, of which the following is a specification.

Reciprocating saws are usually provided with means for effecting the overhang—that is, the forward and backward movements of the saw or gang—to adapt the saw to the feed of the log. For this purpose the upper guides for the saw or gang have been pivoted at their top and in their middle, and provided in various ways with connected means for giving the lower end a fixed adjustment for the required degree of rake or overhang. So far as I know the upper guides have never been adapted to have free forward and backward movements at their lower ends—that is to say, without positive connections—to effect this overhang or rake movement of the saw or gang.

In connection with such free movement of the lower ends of the upper saw-guides, I employ means for supporting or holding the upper saw-buckle in rake when the saw or gang is making the downstroke, and which support is applied and relieved automatically by a connection with the devices for giving the saw or gang the vertical movements.

In such connection I also employ means for effecting the required degree of overhang or rake to suit the feed of the carriage and the character of the log without interfering with the automatic action of the supports to the guides.

The means for supporting the gang in rake also serves to limit its backward movement out of rake, while suitable stops limit the forward movements of the free ends of the guides when moved forward under the action of their cam-supports. The rake-giving devices and the rake-adjusting devices are supported and carried in the same bearings, so that the two things will always maintain the same relation to each other in adjusting the rake.

In operation my invention has been found to give the best results.

Figure 1:
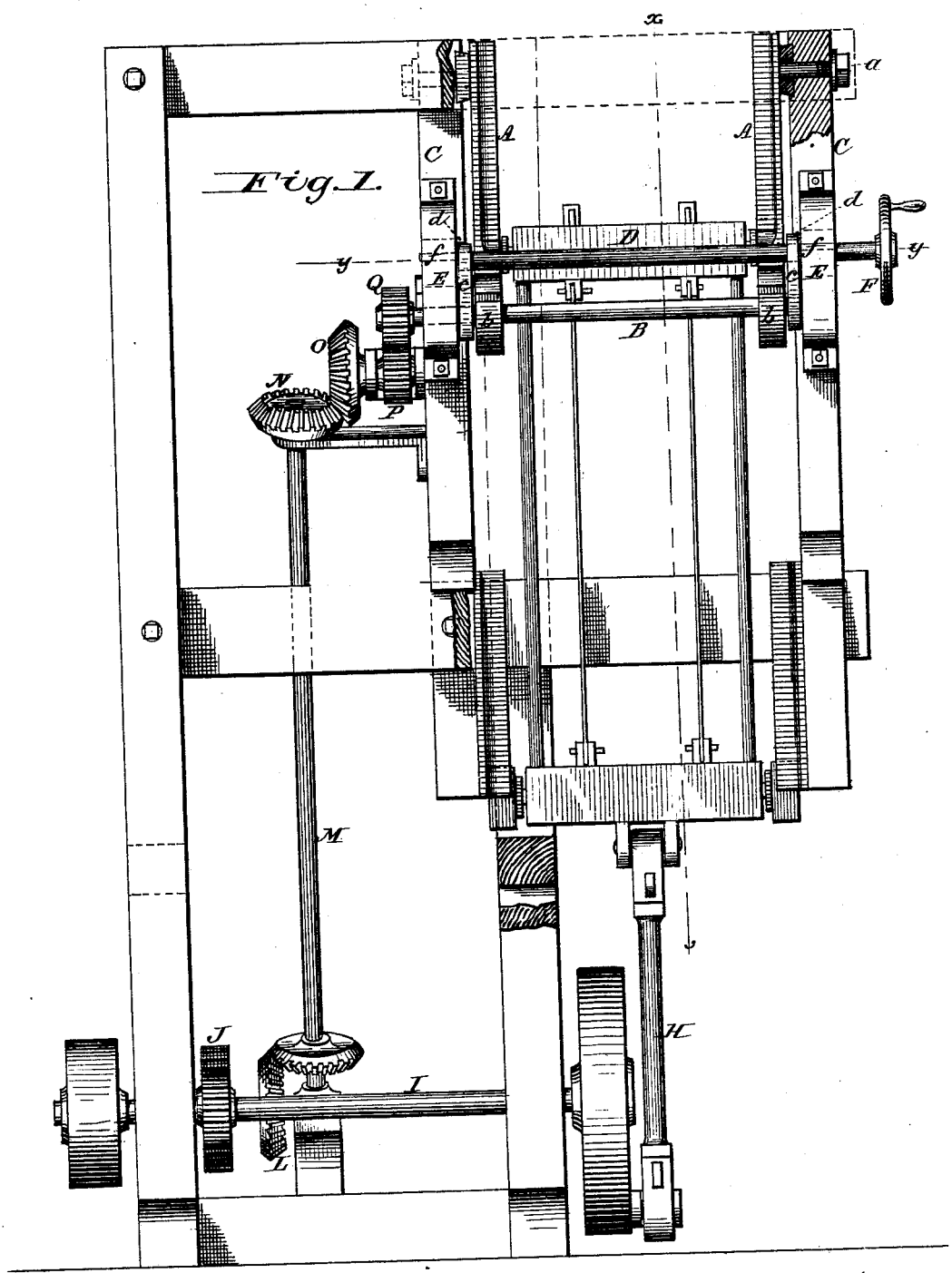
Figure 2:
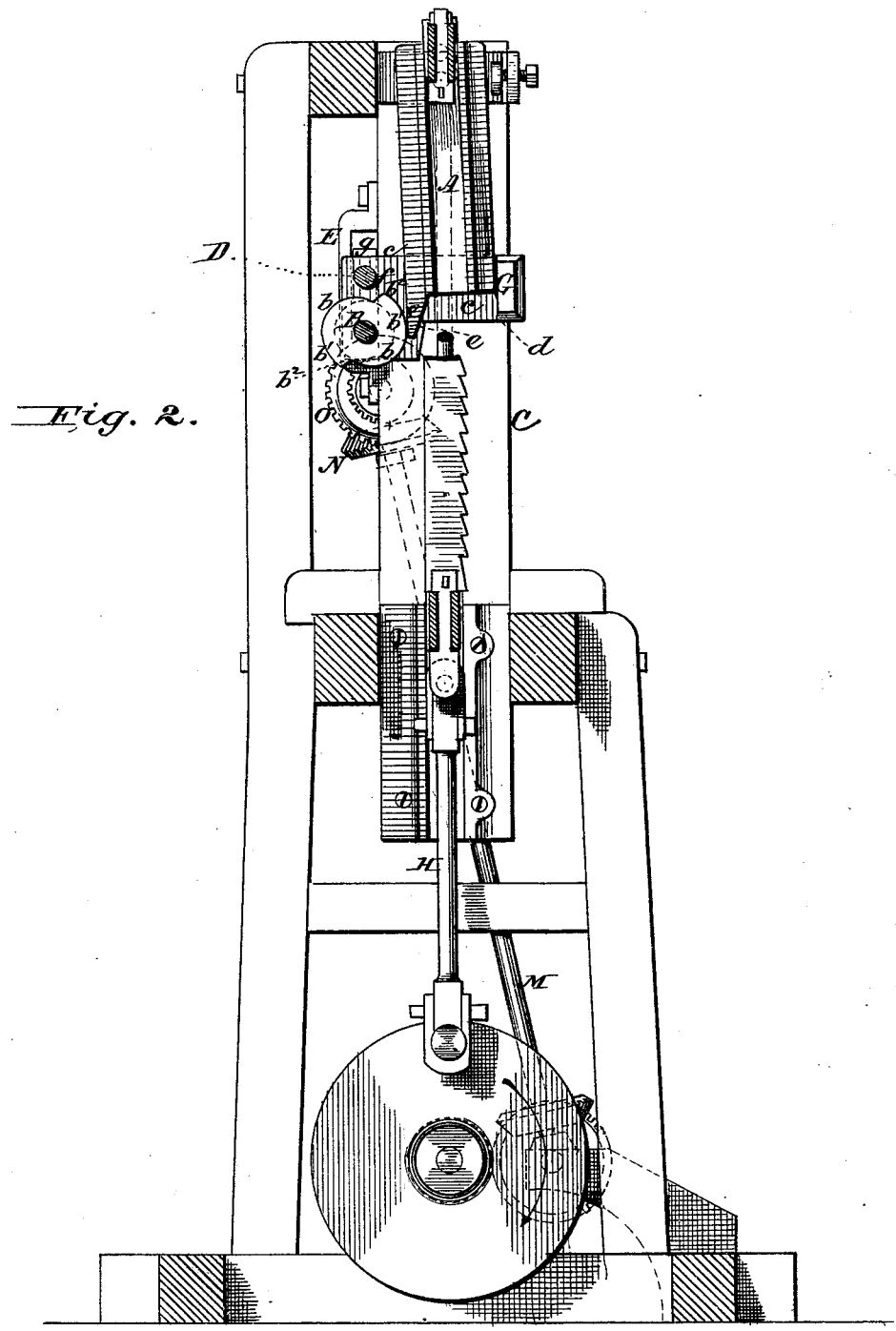
Figure 3:
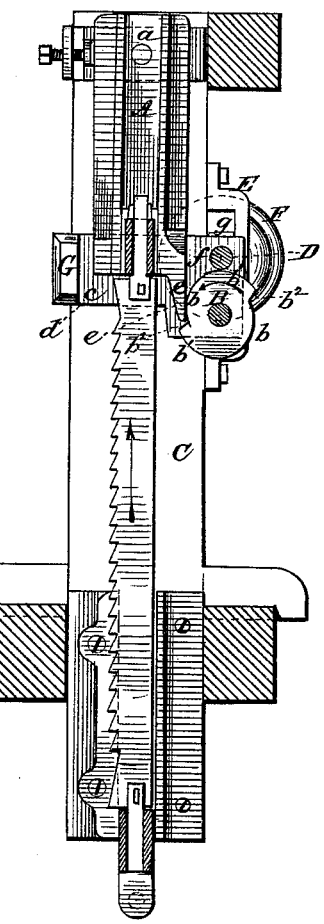
Figure 4:
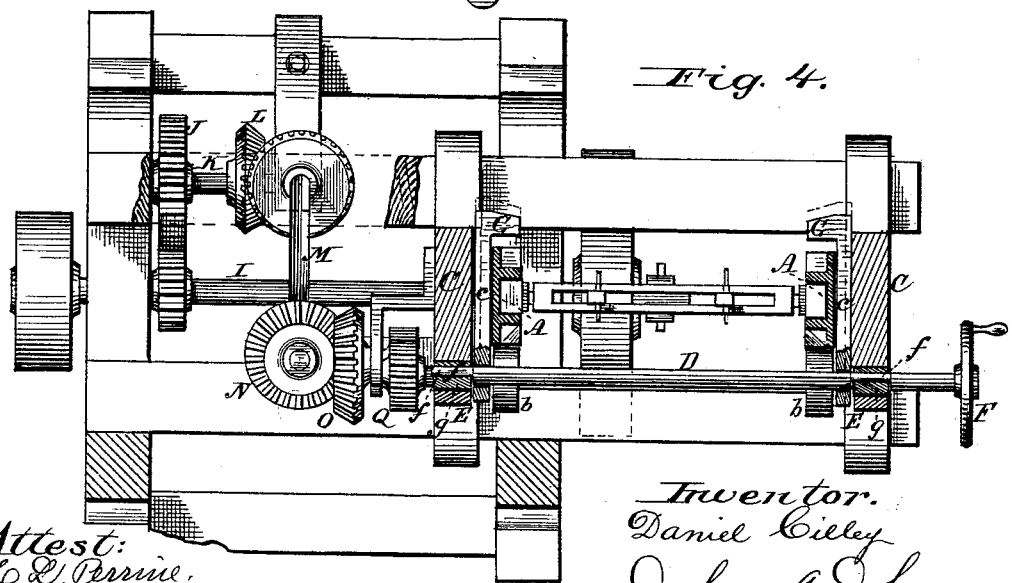

Referring to the drawings, Figure 1 represents a rear elevation of a saw-gang embracing my invention; Fig. 2, a vertical section, the gang being at the limit of its upstroke, showing the lower end of the guide moved forward and supported in position to give the rake as the gang descends; Fig. 3, a similar section, the gang being at the limit of its downstroke, and showing the guide moved back by the automatic release of its support for carrying the gang away from the log as it is fed up; and Fig. 4, a horizontal section taken through the bearing-plates $c\ c$ of the cam-shaft on line $y\ y$ of Fig. 1.

My invention is equally applicable to a single saw, or to what is known as a "gang" of saws, the latter of which I have shown.

Any suitable construction of buckles may be used for carrying the gang; and the framework of the mill may be constructed as shown, or in any suitable way, for carrying the gearing by which the gang and the rake-giving devices are operated simultaneously.

The upper gang-buckle is adapted to work in guides A, pivoted at their upper ends. At their lower ends, however, these guides are adapted to have free oscillating inward and outward movements upon their pivots $a$, which are suitably mounted in the top of the frame. The "rake" of the gang is effected by means of cam-eccentrics $b\ b$, upon the ends of a shaft, B, arranged at the back of the gang and just in rear of the lower ends of the pivoted guides. The bearings for this shaft are in plates $c\ c$, fitted to have a horizontal adjustment in recesses $d\ d$, on the inner sides of the vertical timbers C, to which the guides are pivoted, the object of which adjustment will be presently described. The lower ends of the guides extend over and lie against the inner sides of these bearing-plates, so as to bring a foot-projection, $e$, from said guides in position to receive the action of the cam-eccentric, and thus cause the lower ends of the guides to move to the front to give the gang its rake or overhang, to support it in such in its descending cut, and allow the saws to drop back. The form of these cams is part eccentric and part concentric with their shaft. The eccentric part $b$ is adapted to give the gang its rake while ascending, and the concentric part $b^1$ maintains such rake and supports the gang while descending to make the cut into the log.

The concentric part $b^1$ terminates in a shoulder or step, $b^2$, over which the projecting end $e$ of the guide passes at the limit of the descent of the gang, and thus allows the guides to drop back suddenly, to carry the saws away from the log as it is fed up, to free the saws at the moment of commencing to rise, and to be again placed in rake by the action of the cam-eccentrics, the revolutions of which must be in harmony with the vertical movements of the gang for the purpose stated.

The degree of the overhang or rake is adjusted to suit the character of the log, which also determines whether its feed should be fast or slow. Such adjustment is effected by eccentrics $f\ f$ on the ends of a cross-shaft, D, which has its bearings in the plates $c\ c$, and its eccentrics in boxes $g\ g$, fitted to have a free vertical movement in guides E on the vertical timbers C C, so that as the boxes $g\ g$ cannot move horizontally as the eccentric-shaft D is turned by the hand-wheel F, the bearing-plates $c\ c$ must move toward the front, or toward the rear, just in proportion as the eccentric-shaft is turned; and in such degree are the lower ends of the guides carried toward the front or back, without disturbing their relation to the cam-eccentrics, as their cross-shaft B is carried by said plates $c\ c$, and is therefore adjustable with the guides independent of the frame.

To limit the rake-movement of the guides, the plates $c\ c$ are provided with front stops, G G, against which the lower ends of the guides abut, while the backward movement of the guides is limited by the cam-eccentrics. By this construction the rake-giving cam-eccentrics $b\ b$ and their shaft B, the rake-adjusting eccentrics $f\ f$ and their shaft D, and the front stops, G G, for the guides A are supported by the side plates, $c\ c$, and always maintain their co-operative relation and to the saw-guides.

The gang and the guide-moving devices are not only operated simultaneously, but by the same motor, one means for effecting which I have shown.

The gang is operated in the usual manner by a pitman, H, connected with the horizontal driving-shaft I, from which the guides are operated by a pinion, J, on a short counter-shaft, K, which, by a bevel-pinion, L, drives an upwardly-extending shaft, M, which gears by a top bevel-pinion, N, with a pinion, O, on a short horizontal shaft, which, by a spur-pinion, P, gears with a corresponding pinion, Q, on the end of the shaft of the cam-eccentrics. This gearing is arranged and supported at the side of the gang, over the pitman-driving shaft; and its connection with the motor for operating the eccentrics, by which the guides are moved to the front as the gang rises, and are held in rake as the gang descends, is not only effective but advantageous. The cam-eccentrics support and hold the lower free ends of the guides in position when the saws are making the downstroke, at the end of which the cams turn to a point which lets the said ends of the guides drop back at once from the log as it is fed up, and by the time the saws are up the cam-eccentrics have turned so as to bring the free ends of the guides forward again to the proper place, the front stops, G G, preventing them from moving too far. I mean by the free movement of the lower ends of the upper saw-guides that their lower ends have no positive connections with the rake-producing devices, but that they hang free to be moved toward the front to give the rake to the saw at the proper time by non-connecting eccentrics, operating by contact only against the rear sides of said guides, while the rearward movement of said guides and of the upper end of the saw is effected by the pressure of the log, having a continuous feed against the saw, said rearward movement being effected at the moment the cams $b^1$ reach their terminating bearing-points $b^2$ upon said guides, when the saw is at its lowest descent, so that the saw drops back with a sudden and free movement, and is thereby relieved from undue pressure from the continuous feed of the log.

This is an important advantage, resulting from the freedom of the lower ends of the upper saw-guides to be moved as described, as it renders the saw self-adjusting to the pressure of the log, as contradistinguished from the action of eccentric devices having a positive connection with the upper guides, and which effect and control the frontward movement of the saw only by the operation of such connected devices. In my saw there are no such controlling connections.

As the saw moves back the lower ends of the upper guides strike upon the eccentrics $b\ b$, and thus limit such movement, while the stops G limit the frontward movement of said guides and the saw.

I have described and shown what I call "cam-eccentrics" for producing, holding, and releasing the rake of the saw, carried at its upper end by guides having no controlling connections with said cam-eccentrics; but it is obvious that my invention is not limited to the use of such cam-eccentrics, as other and equivalent means may be employed having the same functions and producing the same results, so long as such means are non-connecting with the saw-guides.

I claim—

1. In a reciprocating saw or gang, the swinging upper guides, in combination with mechanism, substantially as described, for imparting a swinging movement in one direction to the saw and supporting it in rake, leaving the saw and its frame free to be returned or thrown out of rake in its ascent by the movement of the log.

2. In a reciprocating saw or gang, the swinging upper guides, in combination with eccentrics terminating in concentric cams and steps or shoulders adapted to act directly upon said guides to push them forward, hold them, and leave them, substantially in the manner and for the purpose herein set forth.

3. The rake producing, holding, and releasing device of a saw, consisting of the cross-shaft B, carrying at or near each end a double eccentric, $b\ b$, a double cam, $b^1\ b^1$, and dividing steps or shoulders in one and the same device, in combination with the upper saw-guides, A, pivoted as described, and provided with an arm or downward projection, $e$, against which the said eccentrics, cams, and projections act, substantially in the manner and for the purpose herein set forth.

4. The combination, in a saw-mill, of the upper pivoted guides, adapted, by devices constructed substantially as herein set forth, for free frontward and backward movements at their lower ends, with stops arranged to limit the frontward movements of said guides, as stated.

5. The combination, in a saw-mill, of the upper pivoted guides, adapted for free frontward and backward movements at their lower ends, with adjustable plates $c\ c$, over which the free ends of the guides lap, and which carry the cross-shaft B of the cam-eccentrics, and the front stops, G G, for co-operation with said free ends of the guides, as stated.

6. The adjustable side plates, $c\ c$, supported as described, and provided with the front stops, G G, in combination with the cross-shaft B, carrying the cam-eccentrics $b\ b^1$, the cross-shaft D, having the rake-adjusting eccentrics $f\ f$, and the upper saw-guides, A, adapted for co-operative relation to each other, whereby the adjustment of said plates by the eccentrics $f\ f$ to regulate the rake of the saw carries with said plates the rake producing, holding, and releasing devices independent of the frame, with which the rake-adjusting devices D $f\ f$ has a fixed relation, substantially as herein set forth.

7. The combination, with the upper saw-guides, pivoted as described, and the rake producing, holding, and releasing cam-eccentrics $b\ b^1$, adapted to operate directly upon the free lower ends of said guides, of suitable gearing, connecting the shaft B of said cam-eccentrics with the main driving-shaft of the saw in a manner to allow the said cam-eccentric shaft to be adjusted with the slides $c\ c$, which carry it without interrupting said gearing-connection, substantially as herein set forth.

In testimony whereof I have hereunto set my hand.

DANIEL CILLEY.

Witnesses:
THOS. M. JAMES,
NELSON L. ROBERTS.